(12) United States Patent
Chien

(10) Patent No.: US 7,333,671 B2
(45) Date of Patent: Feb. 19, 2008

(54) IMAGE PROCESSING METHOD TO IMPROVE IMAGE SHARPNESS

(75) Inventor: Hui-Jan Chien, Taipei (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 829 days.

(21) Appl. No.: 10/605,422

(22) Filed: Sep. 30, 2003

(65) Prior Publication Data

US 2005/0069216 A1 Mar. 31, 2005

(51) Int. Cl.
  *G06K 9/40* (2006.01)
(52) U.S. Cl. ........... 382/260; 382/165; 382/263; 382/274; 382/275; 358/3.26; 358/3.27; 358/520; 358/463
(58) Field of Classification Search ........... 382/167, 382/260, 274, 275, 263; 358/3.26, 3.27, 358/518, 520, 463
See application file for complete search history.

(56) References Cited

U.S. PATENT DOCUMENTS

| | | | |
|---|---|---|---|
| 4,315,318 A | 2/1982 | Kato | |
| 4,317,179 A | 2/1982 | Kato | |
| 5,608,695 A * | 3/1997 | Yamazaki | 369/44.12 |
| 5,663,940 A * | 9/1997 | Horimai et al. | 369/44.23 |
| 5,937,111 A | 8/1999 | Yamada | |
| 5,963,940 A * | 10/1999 | Liddy et al. | 707/5 |
| 6,057,935 A * | 5/2000 | Freeman | 358/1.9 |
| 6,072,913 A | 6/2000 | Yamada | |
| 6,118,907 A * | 9/2000 | Matama | 382/274 |
| 6,421,468 B1 * | 7/2002 | Ratnakar et al. | 382/254 |
| 6,480,300 B1 * | 11/2002 | Aoyama | 358/1.9 |
| 6,603,886 B1 * | 8/2003 | Matama | 382/274 |
| 6,785,167 B2 * | 8/2004 | Kurth et al. | 365/189.01 |
| 6,791,716 B1 * | 9/2004 | Buhr et al. | 358/1.9 |
| 6,920,243 B2 * | 7/2005 | Damera-Venkata | 382/162 |

* cited by examiner

*Primary Examiner*—Yosef Kassa
(74) *Attorney, Agent, or Firm*—Winston Hsu

(57) ABSTRACT

A method for processing an image to increase sharpness of the image without changing hue characteristics. The method includes performing a transformation process to transform an original image signal into CIE XYZ colorimetric channels, forming a luminance channel Y, applying a filter on the luminance channel Y to obtain a processed luminance channel Y", computing processed colorimetric channels X" and Z" based on the processed luminance channel Y", and performing an inverse transformation process to transform the processed colorimetric channels X"Y"Z" into a processed image signal.

17 Claims, 3 Drawing Sheets

IMAGE PROCESSING METHOD TO IMPROVE IMAGE SHARPNESS

BACKGROUND OF INVENTION

1. Field of the Invention

The present invention relates to image processing, and more specifically, to a method for processing an image using relatively constant CIE XYZ ratios for preserving hue characteristics.

2. Description of the Prior Art

In the past, the unsharp mask (USM) filter has been used to enhance the local contrast (sharpness) of the original image Iorg. The USM filter has been successfully applied in medical imaging and image editing tools. The USM filter operation typically uses a Gaussian low-pass filter to obtain a blurred image Ius, whose blurriness is controlled by a parameter Gaussian radius which indicates Gaussian distribution with radius deviation in Gaussian's probability distribution.

The edge component of the original image is quantified as a (Iorg−Ius) term, which will be multiplied by a β coefficient acting as an amount control parameter. Then, the original image Iorg is added to the enlarged edge component β*(Iorg−Ius) to yield the desired sharper image I". Many previous patents (such as U.S. Pat. No. 4,317,179 and U.S. Pat. No. 4,315,318) have used a similar concept and formula, which is given in Eqn. 1:

$$I'=Iorg+\beta*(Iorg-Ius) \quad (1)$$

Please refer to FIG. 1. FIG. 1 shows an example of one method for carrying out the operation for obtaining the unsharp mask signal Sus according to the prior art. Referring to FIG. 1, the output of a photodetector 121 which measures the light emitted from the stimulable phosphor upon stimulation is amplified by an amplifier 122 which performs amplification including non-linear correction or band compression such as logarithmic conversion to obtain an original image signal Sorg. The original image signal Sorg is fed to an operation unit 123 for conducting the unsharp masking process on one hand and on the other hand sent to a low-pass filter 124 to obtain the unsharp mask signal Sus. In the low-pass filter 124, the analog value of Sorg is filtered with only its super-low frequency component being transmitted therethrough and then converted to a digital signal Si by an A/D converter 125. The converted digital signal is used for calculating an arithmetic mean value $$Sus = \sum aiSi$$

by a digital calculating circuit 126. The obtained value is fed to the operation unit 123 as the unsharp mask signal Sus. In this formula, ai is a weighting coefficient for the signal Si coming from the A/D converter 125. In case of a simple arithmetic mean, ai is made to be equal to 1/N, N being the number of the scanning lines counted in the sub-scanning direction over a range to be covered by an unsharp mask.

As shown in FIG. 1, the original image signal Sorg is fed to the operation unit 123 in the form of an analog signal. Since this signal Sorg has been obtained before the unsharp mask signal Sus is fed to the unit 123, it is necessary to delay the input of the original image signal Sorg so that both the signals Sorg and Sus are simultaneously fed to the unit 123. Alternatively, the original image signal Sorg may be stored in a memory after being converted to a digital value and read out from the memory when it is used together with the unsharp mask signal Sus. In any way, it is necessary to delay the input of the original image signal Sorg into the unit 123 by the time required for the unsharp mask signal Sus to be calculated through the low-pass filter 124, the A/D converter 125 and the circuit 126, so that the signals Sorg and Sus are fed to the operation unit 123 simultaneously.

Another patent, U.S. Pat. No. 5,937,111 uses a similar framework as above and includes extending the estimation of the suitable β coefficient through an image morphology operation. Please refer to FIG. 2. FIG. 2 is a block diagram showing an image processing apparatus according to the prior art. The image processing apparatus illustrated in FIG. 2 carries out image processing on an image signal, which represents an X-ray image, and selectively emphasizes a small calcified pattern, which has a predetermined contour and has an image density value smaller than the image density values of the surrounding image portions.

The image processing apparatus comprises a low pass filter 11 for obtaining an unsharp mask signal Sus, which corresponds to super-low frequency, from an original image signal Sorg, which is an image density signal (a high image density-high signal level type of image signal) representing an image. The image processing apparatus also comprises a subtracter 17 for subtracting the unsharp mask signal Sus from the original image signal Sorg and thereby extracting comparatively high frequency components (Sorg−Sus). The image processing apparatus further comprises a calcified pattern-dependent emphasis coefficient calculating means 20 for extracting a calcified pattern signal, which represents a calcified pattern, from the original image signal Sorg and calculating a first emphasis coefficient βcalc, which is dependent upon the calcified pattern signal. The image processing apparatus still further comprises an edge signal-dependent emphasis coefficient calculating means 30 for extracting an edge signal, which represents an image edge portion, from the original image signal Sorg and calculating a second emphasis coefficient βedge, which is dependent upon the edge signal. The image processing apparatus also comprises a multiplier 41 for multiplying the first emphasis coefficient βcalc and the second emphasis coefficient βedge by each other and thereby calculating a single emphasis coefficient β. The image processing apparatus further comprises a multiplier 42 and an adder 43, which carry out the signal processing with the formula Sproc=Sorg+β*(Sorg−Sus) by using the original image signal Sorg, the high frequency components (Sorg−Sus), and the emphasis coefficient β and thereby obtain a processed image signal Sproc.

In U.S. Pat. No. 6,072,913, extending one specific radius Gaussian filter to set with N various radiuses is taught. The various radius set is used to construct the frequency banded image. Then, the difference of the desired frequency response and the current frequency is calculated to provide good control to the USM band filter.

These methods typically apply the USM filter on device or detector"s signal. Unfortunately, the prior art techniques all have at least two common drawbacks. First of all, the prior art methods generate complementary hue surrounding object hue color when applying USM filters. This does not offer good color reproduction. Secondly, the prior art methods involve complex computation or unnecessarily repeated computation on device signal channels. For instance, a separate pass of the algorithm is used for each of the colors red, green, and blue (RGB) instead of processing the image in one pass. Similarly, if the colors cyan, magenta, yellow, and black are used, four passes will be required.

SUMMARY OF INVENTION

It is therefore a primary objective of the claimed invention to provide an image processing method wherein a colorimetrical characterization and luminance channel of an original image is prepared for USM operation in order to solve the above-mentioned problems.

According to the claimed invention, a method for processing an image to increase sharpness of the image without changing hue characteristics is provided. The method includes performing a transformation process to transform an original image signal into CIE XYZ colorimetric channels, forming a luminance channel Y, applying a filter on the luminance channel Y to obtain a processed luminance channel Y", computing processed colorimetric channels X" and Z" based on the processed luminance channel Y", and performing an inverse transformation process to transform the processed colorimetric channels X"Y"Z" into a processed image signal.

It is an advantage of the claimed invention that the colorimetric channels X" and Z" are calculated based on the processed luminance channel Y" for maintaining a constant ratio between X, Y, Z and X", Y", Z", and maintaining hue characteristics in the processed image.

These and other objectives of the claimed invention will no doubt become obvious to those of ordinary skill in the art after reading the following detailed description of the preferred embodiment, which is illustrated in the various figures and drawings.

DETAILED DESCRIPTION

The present invention utilizes an efficient algorithm to enhance image sharpness while preserving hue characteristics of the original image. An image detector or capturing device often captures the sharpness loss image due to worse system modulation transfer function (MTF). The captured image pixels have a strong correlation to neighbors, and relation strength is similar to Gaussian distribution types. This would highly reduce the strength of high frequency components in the original image. The major photo quantum contribution to one pixel detector can be modeled as summation of all neighbor's radian power with Gaussian-like distribution weight. The radian power is convoluted by a luminous efficiency function to yield the luminance scale. It turns the infinite visible spectrum to one dimension for simplifying processing. To apply a USM or sharpness filter would be more reasonable when its input/output is linearly proportional to a luminance scale like CIE Y. The device signal is often not linearly proportional to a luminance scale. Therefore, in the present invention, the input/output processing of a USM or sharpness filter would be based on the Commission Internationale de l'clairage (CIE) 1931 Y scale. Clearly, this processed color of the present invention has only a luminance Y" component. The other CIE X" and Z" processed color components could be respectively calculated from the original color XYZ and processed Y" by the formulas $X"=(X/Y)*Y"$ and $Z"=(Z/Y)*Y"$. The present invention keeps XYZ relative ratios constant to keep the hue of the processed color consistent with the hue of the original image color.

Figure 1:
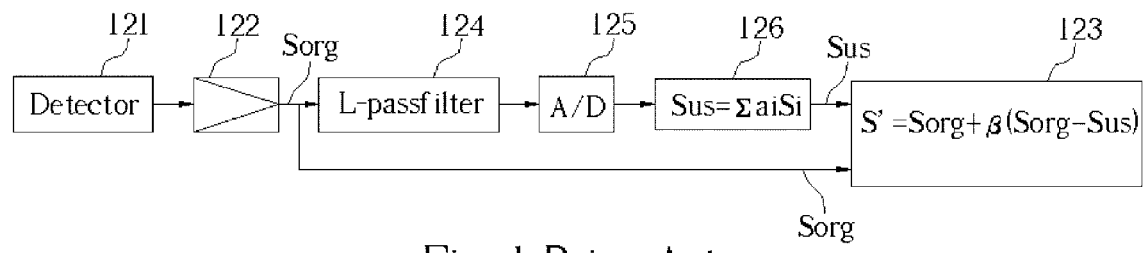
FIG. 1 shows an example of one method for carrying out the operation for obtaining the unsharp mask signal Sus according to the prior art.
Figure 2:
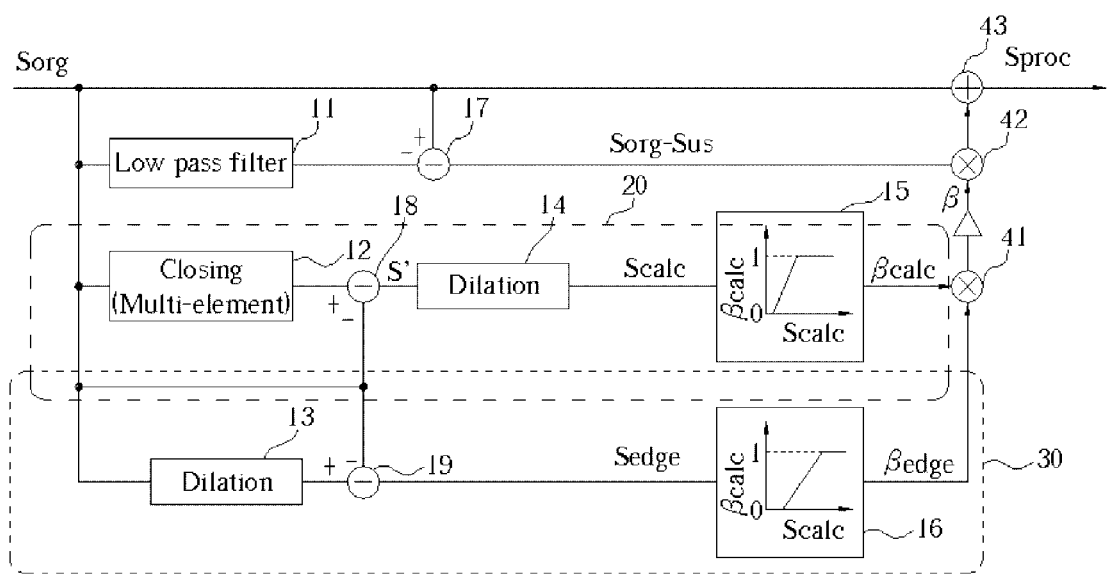
FIG. 2 is a block diagram showing an image processing apparatus according to the prior art.
Figure 3:
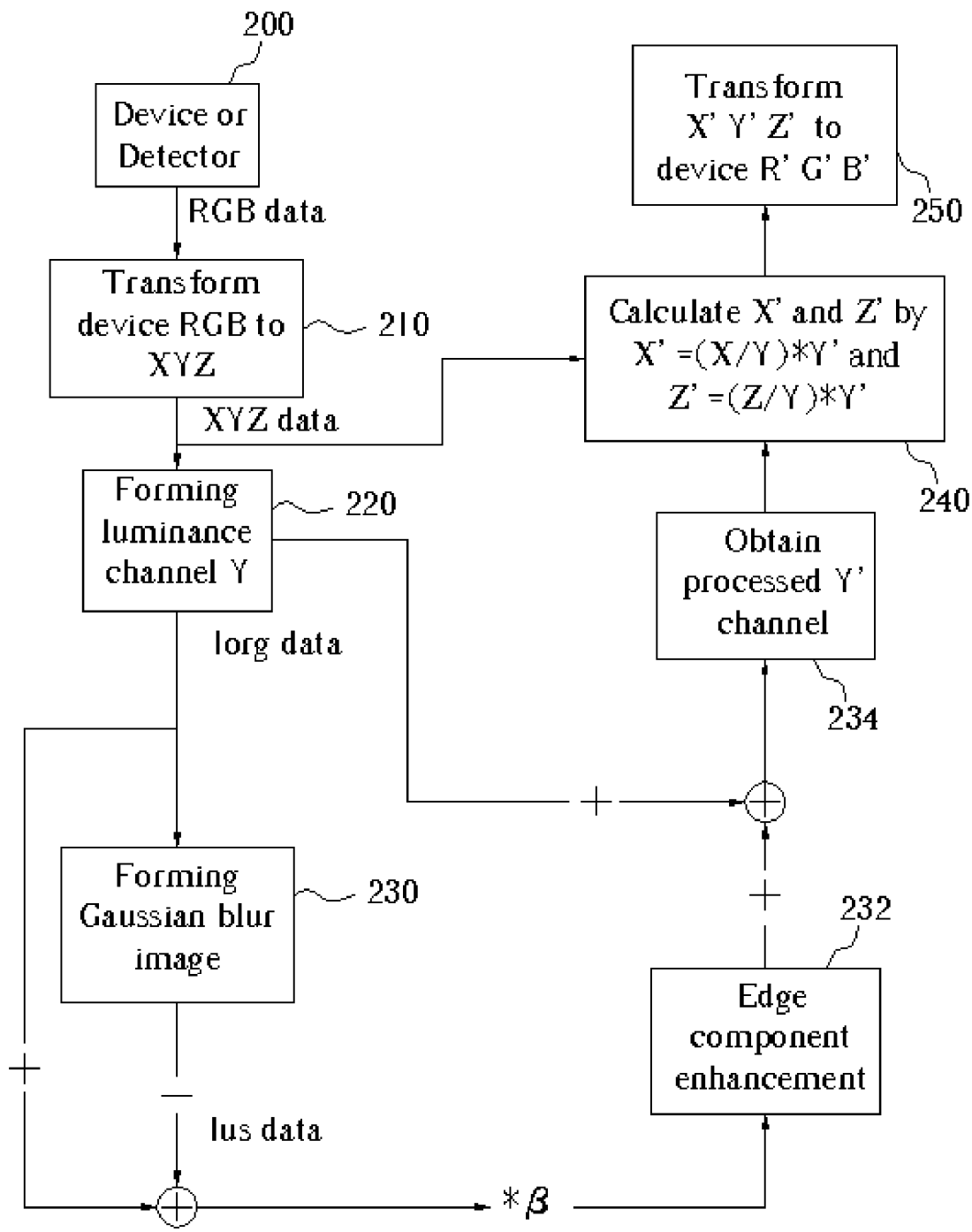
FIG. 3 is a flowchart outlining steps of the present invention image processing method.

Please refer to FIG. 3. FIG. 3 is a flowchart outlining steps of the present invention image processing method. Steps contained in the flowchart will be explained below.

In step 200, an image detector or capturing device provides color information in the form of red, green, and blue (RGB) components. Please note that instead of RGB colors, other colors components such as CMY or CMYK (cyan, magenta, yellow, and black) components can be used as well. In step 210, the RGB data components are transformed into CIE XYZ components. Out of these XYZ components, the luminance channel Y is formed in step 220. In steps 230 and 232, a USM or sharpness filter is applied on the luminance channel Y to yield a processed luminance channel Y". Step 230 involves forming a Gaussian blur image while step 232 provides edge component enhancement. The resulting processed luminance channel Y" is obtained in step 234. Next, in step 240, processed colorimetric channels X" and Z" are calculated based on the processed luminance channel Y". The formulas used to calculate X" and Z" are $X"=(X/Y)*Y"$ and $Z"=(Z/Y)*Y"$. Since X" and Z" are calculated based on the processed luminance channel Y", the ratios of processed colorimetric channel values X":Y" and Z":Y" are respectively equal to the ratios of colorimetric channel values X:Y and Z:Y. In other words, $X:Y:Z=X":Y":Z"$. Finally, in step 250 the processed colorimetric channel data values are transformed into R"G"B" (can also be C"M"Y"K" or C"M"Y") data values using an inverse of the transformation function used in step 210.

In summary, since the present invention method processes colorimetric channel values such that $X:Y:Z=X":Y":Z"$, the processed image has the same hue characteristics as the original image. Therefore, the problem in the prior art in which a complementary hue is generated surrounding object hue colors when applying USM filters is avoided. Moreover, only one pass of the present invention algorithm is needed to calculate X", Y", and Z" as compared to three different passes required in prior art methods. Not only does the present invention method offer higher calculation efficiency than the prior art, but also hue characteristics are more accurately generated as well.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for processing an image to increase sharpness of the image without changing hue characteristics, the method comprising:
   (a) performing a transformation process to transform an original image signal into CIE XYZ colorimetric channels;
   (b) forming a luminance channel Y;
   (c) applying a filter on the luminance channel Y to obtain a processed luminance channel Y';
   (d) computing processed colorimetric channels X' and Z' based on the processed luminance channel Y', wherein a relationship between the processed colorimetric channel X' and the colorimetric channel X satisfies the equation $X'=(X/Y)*Y'$; and
   (e) performing an inverse transformation process to transform the processed colorimetric channels X'Y'Z' into a processed image signal.

2. The method of claim 1 wherein the filter applied in step (c) is an unsharp masking (USM) filter.

3. The method of claim 1 wherein the filter applied in step (c) is a sharpness filter.

4. The method of claim 1 wherein in step (a) the transformation process comprises transforming RGB values of the original image signal into CIE XYZ colorimetric channels.

5. The method of claim 4 wherein in step (e) the inverse transformation process comprises transforming the processed colorimetric channels X'Y'Z' into R'G'B' values of the processed image signal.

6. The method of claim 1 wherein in step (a) the transformation process comprises transforming CMYK values of the original image signal into CIE XYZ colorimetric channels.

7. The method of claim 6 wherein in step (e) the inverse transformation process comprises transforming the processed colorimetric channels X'Y'Z' into C'M'Y'K' values of the processed image signal.

8. The method of claim 1 wherein in step (d) a relationship between the processed colorimetric channel Z and the colorimetric channel Z satisfies the equation $Z'(Z/Y)*Y'$.

9. An image processing apparatus for implementing the method of claim 1.

10. A method for processing an image to increase sharpness of the image without changing hue characteristics, the method comprising:
   (a) performing a transformation process to transform an original image signal into CIE XYZ colorimetric channels;
   (b) forming a luminance channel Y;
   (c) applying a filter on the luminance channel Y to obtain a processed luminance channel Y';
   (d) computing processed colorimetric channels X' and Z' based on the processed luminance channel Y', wherein a relationship between the processed colorimetric channel Z' and the colorimetric channel Z satisfies the equation $Z'=(Z/Y)*Y'$; and
   (e) performing an inverse transformation process to transform the processed colorimetric channels X'Y'Z' into a processed image signal.

11. The method of claim 10 wherein the filter applied in step (c) is an unsharp masking (USM) filter.

12. The method of claim 10 wherein the filter applied in step (c) is a sharpness filter.

13. The method of claim 10 wherein in step (a) the transformation process comprises transforming RGB values of the original image signal into CIE XYZ colorimetric channels.

14. The method of claim 13 wherein in step (e) the inverse transformation process comprises transforming the processed colorimetric channels X'Y'Z' into R'G'B' values of the processed image signal.

15. The method of claim 10 wherein in step (a) the transformation process comprises transforming CMYK values of the original image signal into CIE XYZ colorimetric channels.

16. The method of claim 15 wherein in step (e) the inverse transformation process comprises transforming the processed colorimetric channels X'Y'Z' into C'M'Y'K' values of the processed image signal.

17. An image processing apparatus for implementing the method of claim 10.

* * * * *